Patented Feb. 26, 1935

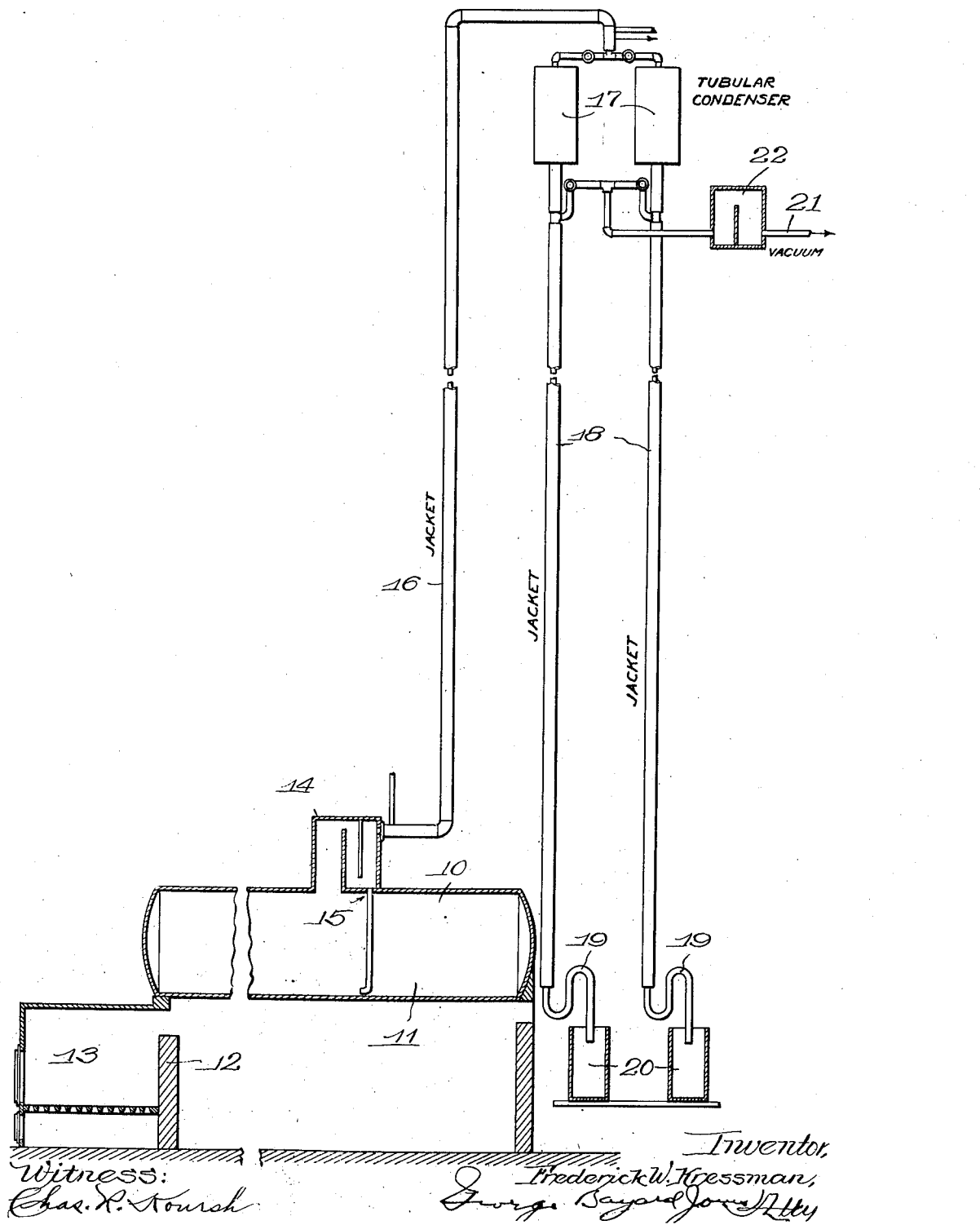

1,992,754

UNITED STATES PATENT OFFICE 1,992,754

TREATMENT OF ROSIN

Frederick W. Kressman, Laurel, Miss., assignor, by mesne assignments, to Continental Turpentine & Rosin Corporation, Inc., Laurel, Miss., a corporation of Louisiana Application February 11, 1929, Serial No. 339,047

3 Claims. (Cl. 202—52)

The present invention relates to treatment of rosin, such as wood rosin and gum rosin, and similar materials, for the preparation of new products containing, as desired, varied proportions of certain components of the initial base material, preferably maintaining throughout the treatment certain conditions which minimize decomposition in the process. The invention also has reference to treatment of abietic acid itself or of other materials containing abietic acid.

Wood rosin, especially that which is produced by the action of steam and solvents on pine stumps and the like, is found on the market in various grades which are classified in desirability by the color of the product. Gum rosin, is produced by distillation of oleo-resin exuded by living trees, in order to remove turpentine and to leave rosin. Such residual rosin may be light or dark. It is the aim of the gum rosin producer to so carry out his production and process as to produce a light colored grade which in most cases does not differ in chemical characteristics from the darker grades.

All of these rosins contain so-called "resene" and rosin acids as the chief constituents, and may contain some rosin oil derived by decomposition of the base rosin under the action of heat. The rosin acids are known as and are hereinafter referred to as abietic acid. The rosin oil although acid in character is to be distinguished from abietic acid of which it is a decomposition or conversion product in some distillation processes. The resene constituent is an undesirable gummy or tacky impurity in the useful abietic acid constituent in certain industries. Rosin is useful for making soap by neutralization of the abietic acid. The resene appears to be chemically an inactive constituent but has marked influences on the character of the soap, and limits the amount of rosin at present used in soap. For example, if a rosin soap is chipped and allowed to stand, the soap chips coalesce into a solid mass.

Rosin may be esterified to form ester gums. The abietic acid is the active agent in this process and the resene is an impurity in the ester gum which is produced. Resene is sometimes considered a useful substance in ester gums and it is therefore desirable to provide various mixtures of resene and abietic acid to secure such special ester gums.

In the foregoing and in other uses of rosin, color is the official designation of the various commercial grades, regardless of the chemical composition. The dark color is considered low grade, although it may have as great a purity as a high grade rosin.

In the prior art, processes have been proposed for improving the color so that a low grade rosin may be sold as a high grade rosin. Some of these treating processes are such that decomposition of the base materials is effected in the process, and when this occurs, a lighter color in the product can have no relation to composition, and the treatment to improve the grade by color may in fact render the product chemically inferior.

It is known that distilling rosin at atmospheric pressure converts part of it into rosin oil, which is different in properties from the abietic acid. Steam distillation has been proposed by Mariner, Pat. No. 1,114,270, and also vacuum distillation, in Mariner Pat. No. 1,117,584. Mariner aims to convert the abietic acid into rosin oil for use as a grease set. Donk in Pat. No. 1,219,413 recommends continuous distillation in vacuo at 100 mm. pressure, for the purpose of separating the volatile light colored rosin ingredients from the non-volatile dark coloring agents. Although Donk states that when the pressure does not exceed 100 mm., the decomposition is slight, his description of his products clearly indicate considerable decomposition. He states that a soft mass is obtained, indicating decomposition and the presence of rosin oil.

Donk aims only to improve the grade of rosin by his separation and to secure an end product which is substantially the same as his initial product except that the colored ingredients are removed. Donk accomplishes this by continuously admitting his base rosin onto a hot surface in a distillation chamber, so that the volatile and non-volatile ingredients are separated.

The present invention is based upon the observation that the volatile constituents of rosin have different degrees of volatility, and that they may be to some degree selectively distilled from batches of rosin in a manner such that concentration of the ingredients may be effected. More particularly stated, I have discovered that in batch distillation, the resene content of rosin is the more volatile and is largely removed in the first stages of distillation, thereby permitting in the last stages of the distillation the volatilization of abietic acid in a state more concentrated than in the initial material. By this process I am able to separate from rosin or similar material a product which is high in resene content and a product which is high in abietic acid content.

In so doing, however, there are other considerations which determine the conditions under which the process is carried out. Decomposition characterizes distillation of rosin and the higher the temperature of distillation the greater is the decomposition. Mariner shows that decomposition is considerable at temperatures corresponding to 22 inches of vacuum and he employs such conditions to create products of decomposition. Donk states that decomposition is slight at 100 mm. pressure, but description of his products indicates that some decomposition takes place. Of course, the short time during which his rosin is subjected to heat favors less decomposition and his product must compare favorably in composition with the low grade material employed, except that what decomposition has taken place tends to lower the abietic acid content of his product.

The present invention is based upon researches into the fractional distillation of rosins at reduced pressure to form products which may contain more resene or more abietic acid than the initial rosin. In order to do this I have found that resene and abietic acid may be separated by batch distillation in order to concentrate resene. When resene is thus concentrated in a distillate the residual material in the still will contain an increased concentration of abietic acid, provided decomposition has not occurred to alter or reduce the original content of abietic acid. Such a still residue may be used as a product high in abietic acid, although it may be also higher in coloring matter. When it is desired to concentrate abietic acid free from coloring matter, as in a distillate, the decomposition must be so minimized or presented that the distillation process effects predominance of concentration rather than decomposition. It is further possible by practice of the present invention to remove resene from the rosin and thereafter to distill under conditions which produce the decomposition product of Mariner, whereby to form a high grease-set of decreased resene content.

From the foregoing it will be understood that the limits of permissible decomposition are determined by the character of product which it is desired to produce.

In practicing my invention I have discovered that the process may be carried out at such a high degree of vacuum that a substantially negligible degree of decomposition is encountered. By so carrying out distillation under these conditions no attention need be given to regulating the conditions according to the products desired. Yet I do not intend to limit this invention to such a high degree of vacuum as that to which I have just referred, but aim to include such pressures as are suitable to realization of the various objects of the invention.

The object of the invention is the distillation at controlled low pressures of rosin to separate the resene and abietic acid content from other impurities without any substantial decomposition, or with a controlled decomposition.

Another object of the invention is the formation by distillation of a product more highly concentrated in resene than the original base material.

Still another object is the formation by distillation of a product more highly concentrated in abietic acid than the original base material.

Still another object is the formation of a product which is high in concentration of abietic acid, having very little or substantially no resene content.

Another object of the invention is the distillation of rosin at low pressures, preferably of from 2 mm. to 10 mm., and at a temperature not over 240° C., and thereafter distilling off abietic acid at a pressure not over 20 mm. and at a temperature not over 270° C., but preferably not over 260° C. so that a commercially negligible degree of decomposition takes place.

A more specific object of the invention is batch distillation at low pressures without substantial decomposition.

Another object of the invention is the fractional condensation of the distillate to produce light colored products of varying and controlled proportions of resene and abietic acid.

Another object of the invention is the distillation of rosin under vacuum but at such pressures as will cause decomposition and produce products of desired composition.

In my investigations I have found that increased time, temperature and pressure favor decomposition of rosin in distillation processes. In order to practice the present invention it is necessary to reduce all these factors to a point as low as is consistent with results desired. Temperature and pressure are by nature so related that increasing the vacuum automatically lowers the distillation temperature. In my process I have found that the low pressure which I employ causes a sufficiently low distillation temperature so that a bottom heated type of tank still may be used in distilling a large quantity of rosin with minimized decomposition.

In the accompanying drawing there is shown one type of apparatus that is suitable for carrying out the process of the present invention.

In order best to explain the invention I will describe generally how the process is carried out, the kinds of raw material that may be employed, the difficulties encountered, the products obtained, and the changes in the products with changes in operating conditions.

I may use any tight vessel of resistant material, as a still, heat the same directly or by a heated bath of liquid metal or otherwise, employ a high vacuum in the still, condense the vapors, and collect the condensate in one or more fractions to control the character of the product. Receivers for the condensate are so related to the apparatus that a change from one to another may be effected without breaking or lessening the vacuum on the still. An increase of pressure would readily permit overheating and might cause decomposition which would affect the desired character and control of the composition of the product.

I may use gum rosin analyzing as follows:

Table I

| | Resene content % of original wt. | Abietic acid content % by wt. | Melting point degrees C.[1] |
|---|---|---|---|
| Grade WW | 7.5 | 88.4 | 67° |
| Grade K | 7.3 | 88.6 | 78° |
| Grade B | 7.8 | 86.0 | 72° |

[1] Continental Turpentine & Rosin Corp. drop method.

Gum rosins from different localities may vary in resene content from 7% to 8%, and in abietic acid content from 85% to 90%. The melting points given throughout the specification should be considered, not as exact values, but as values measured under prescribed conditions for comparative purposes.

Wood rosins may be used analyzing as follows:

Table II

|  | Resene % by wt. | Abietic acid % by weight | Melting point degrees C. |
|---|---|---|---|
| Grade FF | From 8.8 to 9.5 | 83% to 85% | 70° to 72° |
| Limed FF | 9 to 9.5 | 75% to 80% | 82° to 85° |

In using commercial rosins like the above it has been found that a small amount of moisture and oils, such as turpentine in gum rosin, and pine oil in wood rosin, will cause violent frothing in the first heating of the rosin. To remove these volatiles from a distillation batch may consume more time than the actual distillation of the bulk of the material. I have found that these are best removed at lower temperatures before distillation or as a separate step, and when the melted rosin is thus dried and freed from such moisture and oils at 5 mm. pressure, no further trouble is experienced with foaming or frothing during the major distillation.

The speed of distillation depends upon the rate of heat transfer to the still, the rate of conducting vapors from the still, the condensing surface, the capacity of the vacuum pump, the degree of vacuum, etc., all of which factors are well understood by those skilled in the art of distillation.

The temperature of distillation also varies in accordance with conditions well known to distillers, including chiefly the composition in the still and the vacuum employed. The lower the vacuum the lower the temperature. For example at pressure P the resene is removed at temperatures Tr and the abietic acid at temperatures Ta, shown in the following:

Table III

| P | Tr (resene) | Ta (abietic acid) |
|---|---|---|
| 2 to 5 mm | 190° C.–220° C. | 220° C.–240° C. |
| 10 mm | 205° C.–240° C. | 240° C.–260° C. |
| 20 mm | | 260° C. 250° C.–270° C. |

As pressure increases above 20 mm., there is evidence of increasing decomposition as the abietic acid fractions cease to be clear hard gums and become increasingly plastic and even tacky and gummy.

I have found that the melting point of the distilled product increases as the resene content is lowered. Therefore, the first portions distilled over, being high in resene content have a low melting point. The following table shows a relationship for a distilled wood rosin.

Table IV

| Melting point viscous degrees C. | % resene above 15% |
|---|---|
| 53 | 14.4 |
| 57 | 11.0 |
| 57.5 | 8.5 |
| 58 | 8.02 |
| 70 | 3.24 |
| 72 | 3.1 |
| 73–74 | 2.9 |
| 79–81 | 2.5 |
| 82 | 1.7 |

The table shows clearly that products are obtainable which vary in resene content from one much higher to one much lower than that which characterizes natural rosin. By selecting the fractions, or by selecting and combining fractions, I am able to produce at will many different and special compositions.

Using rosin as a base for distillation the compositions of the fractions to some degree limits the combinations and compositions that can be obtained, but it is to be understood that these fractions may be again distilled giving greater latitude in the preparation of products. For example, in distilling a rosin base it is practicable to secure a small fraction which analyzes up to 33% resene, and it is very easy to produce a large fraction which is over 97% abietic acid. From such a process using rosin as a base it is therefore not easy to produce directly a fraction which is substantially pure resene. Nevertheless, since the rosin contains only 7% to 8% resene, which can be concentrated to about 30% in a fraction, it will be readily understood that these fractions of about 30% resene may themselves be subjected to distillation for further concentration of resene.

In order to illustrate the nature of the fractions which can be obtained by distilling rosin the following analysis of distillation conditions and fractions is given.

Table V

Charging stock continental FF wood rosin

| Fraction | Absolute pressure in mm. | Temp. degrees C. | Yield. % of charged stock | Distilled resene % by wt. | Gum abietic acid | Melting point degrees C. |
|---|---|---|---|---|---|---|
| I | 4 | 185–200 | 1.38 | 23 | 59.4 |  |
| II | 4 | 200–220 | 10.80 | 22 | 68.7 |  |
| III | 4 | 209–222 | 11.67 | 11 | 75.7 |  |
| IV | 4 | 212–222 | 2.67 | 8.5 | 87.4 | 57½ |
| V | 4 | 219–227 | 7.00 | 8.02 | 88.9 | 57 58 |
| VI | 4 | 222–236 | 16.57 | 3.1 | 96.6 | 72–75 |
| VII | 4 | 226–236 | 19.57 | 2.2 | 98.2 | 73–74 |
| VIII | 4 | 226–236 | 11.17 | 2.5 | 97.0 | 79–81 |
| IX | 4 | 234–244 | 6.20 | 7.8 | 82.1 |  |
| Residue |  |  | 10.63 | Moisture and oils | 2.08 |  |
| Total Solids |  |  | 97.66 | Noncondensable gas | .26 |  |

Table VI

Charging stock B grade gum rosin

| Fraction No. | Absolute pressure in mm. | Temp. in 0° C. | Yield in % of charged stock | Resene % | Abietic acid | Melting point degrees C. |
|---|---|---|---|---|---|---|
| I | 30 to 13 | 130–216 | 6.8 | 39.7 | 54.5 | Viscous |
| II | 12 to 8 | 216–235 | 6.7 | 28.5 | 79.5 | 58 |
| III | 8 to 7 | 235–245 | 12.7 | 7.7 | 94.0 | 72.5 |
| IV | 7 to 6 | 245–243 | 12.9 | 4.6 | 96.3 | 79.5 |
| V | 6 | 244–246 | 11.7 | 2.14 | 98.4 | 73 to 80 |
| VI | 7 | 246–254 | 13.7 | 5.3 | 94.3 | 77 |
| VII | 6 | 254–258 | 8.5 | 12.8 | 86.7 | 68.5 |

In the foregoing Table V it will be noted that fractions VI to VIII amount to substantially 50% of the charged stock and average over 97% pure abietic acid. They form a clear brilliant, bright light yellow gum grading better than X on the gum rosin standards. Its purity is so high that great care must be taken to prevent crystallization to an opaque condition. Other fractions III to V may be combined into a product which is about 20% of the initial stock and substantially the same as the initial stock in resene and abietic acid content. This may be graded as a WW wood rosin.

The color of the products is much lighter than the base material employed. The colors vary, however, with the base material. Using B gum rosin as a base I may obtain products grading from M to WW grades. Using wood rosin I may obtain products grading from WG to X and higher. I have found that the color may be decreased by admitting through the distillation mass a stream of air (without destroying the vacuum). Although this practice may be used for improving the grade by color, I have found it decreases the abietic acid content of the products. I have not determined whether it is merely the gaseous effect of the air which accomplishes this.

The residue in the still varies according to the type of material employed. Low grade gum rosin usually contains more dirt and trash than wood rosin. All these factors affect the character of still residue. In general, the residue may be described as dark brown or black in color, having a high melting point, and being gum-like in character. It is low in abietic acid content. It may be used in connection with soft pitches for the production of hard pitches. The residue averages about 10% of the base material employed in the still.

Using a limed wood rosin in which some lime resinate is present I have found that I get substantially the same resene products and as high abietic acid fractions as with standard wood rosins. But the total yield of abietic acid is decreased. All the fractions are more or less greasy and tacky. It is apparent that the distillation of resinate salts, such as the calcium resinate, yields some different products which accounts for the greasy and tacky character of the abietic acid product. So far as I have been able to determine this is the only difference in the products of the various rosins, and gum rosin of low grade yields substantially the same products as standard wood rosin.

In practical operation I prefer to dry the moisture and oils from the base material in a separate process. Therefore I may subject the base material to heat and vacuum at temperatures too low to distill the resene and abietic acid and to injure the material, but sufficiently high to cause the moisture and oils to be driven out of the rosin. I have found that gum rosin more particularly needs this treatment as it contains considerable moisture and oil (turpentine or sesquiterpenes) which should be removed to prevent foaming in subsequent high vacuum distillation.

As an example of apparatus suitable for the conduct of the process of the invention I represent a still 10 which may be 8 feet in diameter by 30 feet in length, mounted over a fire chamber 11 into which direct flames pass over wall 12 from a fire pit 13. A dome 14 is provided on the still and has a foam trap 15 therein. A steam jacketed vapor line 16 leads to two condensers 17. The condensers may employ steam or hot water as condensing medium, and exhaust steam from each condenser may be used to heat the jacketed vacuum leg 18. This leg comprises a small sized pipe of about 36 feet length having a trap 19 at the bottom, from which condensate may flow into a receiver 20. A vacuum line 21 connects to the cold side of the two condensers and is operated by high capacity efficient low pressure vacuum pumps as required for the capacity of the apparatus and the necessities of the process. A trap 22 may be placed in the vacuum line.

Two condensers are provided so that one may be used constantly to receive high abietic acid fractions and the other to receive other fractions. The number may be increased if desired.

In carrying out the process, the still is filled with material which may already have been dried by previous heating in a vacuum chamber. If it has not been dried vacuum is applied to the material, and as the rosin is heated the exposure to heat is prolonged in order to permit the moisture and low volatile oils to be removed so that foaming will not take place during the distillation of the rosin products.

The dried rosin is by this time subjected to a distilling heat and a low pressure of say 5 to 10 mm., or lower, or higher, as may be desired, and the resene content first distilled accompanied by some of the abietic acid forming fractions which are high in resene and low in abietic acid. As the distillation continues the resene in the distillate decreases in quantity, and the vapors arising from the still constitute chiefly abietic acid. This condensate may be collected as an abietic acid product. The earlier fractions which are high in resene may be conserved and mixed in various proportions with each other, or with the abietic acid fractions in order to arrive at any desired composition of resene and abietic acid.

I do not consider that the invention is limited to the distillation of the extremely low pressures which I have given, although I prefer for the best results to use these low pressures. I believe that up to about 20 mm. pressure no decomposition or very little decomposition takes place. Using higher pressures I may continue the distillation to recover high resene fractions and when decomposition occurs to collect rather than pure abietic acid, a fraction which is composed of abietic acid and its decomposition products rosin oil. Such a process will produce a product which is low in resene and is thus distinguished from the rosin oils that are obtained by distillation under decomposition conditions of the various rosins, as described in the prior art, for example Mariner.

The products which I obtain may be used as rosin or as rosin substitutes, and the utility of these products may be adapted for special needs of processes now employing rosin. For example, in the soap industry, the elimination of resene from abietic acid may improve the quality of soap which is obtained. In the lacquer industry the formation of ester gums may be varied by using products which have a controlled composition of resene and abietic acid. The resene in ester gums is sometimes considered a desirable constituent, so that being able to control the quantity of resene I am able to provide a stock for ester gum formation which may meet various specifications and produce ester gums of special or improved properties.

Various other uses for the products will appear to those who are skilled in the art of using rosin and rosin products.

I claim:

1. The process of refining wood rosin which comprises distilling the same under an absolute pressure not greater than 10 mm. of mercury and at a temperature not over 240° C., whereby the resene content is largely removed from the still, and thereafter distilling the residue in the still at an absolute pressure not over 20 mm. of mercury and at a temperature not over 270° C., whereby abietic acid in the still is distilled without substantial decomposition.

2. The process of refining wood rosin which comprises distilling the same under an absolute pressure not greater than 10 mm. of mercury and at a temperature not over 240° C., whereby the resene content is largely removed from the still, and thereafter distilling the residue in the still in the presence of foreign gas at an absolute pressure not over 20 mm. of mercury and at a temperature not over 270° C., whereby abietic acid in the still is distilled without substantial decomposition.

3. The process of refining wood rosin which comprises distilling the same under an absolute pressure not greater than 10 mm. of mercury and at a temperature not over 240° C., whereby the resene content is largely removed from the still, and thereafter distilling the residue in the still in the presence of air at an absolute pressure not over 20 mm. of mercury and at a temperature not over 270° C., whereby abietic acid in the still is distilled without substantial decomposition.

FREDERICK W. KRESSMAN.